(12) United States Patent
Sahraoui et al.

(10) Patent No.: US 11,477,447 B2
(45) Date of Patent: Oct. 18, 2022

(54) SINGLE PASS FILTER COEFFICIENTS SELECTION

(71) Applicant: ATI TECHNOLOGIES ULC, Markham (CA)

(72) Inventors: Zohair Sahraoui, Markham (CA); Edward Harold, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/032,741

(22) Filed: Sep. 25, 2020

(65) Prior Publication Data

US 2022/0103814 A1 Mar. 31, 2022

(51) Int. Cl.
*H04N 19/117* (2014.01)
*H04N 19/103* (2014.01)
*H04N 19/176* (2014.01)
*H04N 19/147* (2014.01)
*H04N 19/149* (2014.01)

(52) U.S. Cl.
CPC ......... *H04N 19/117* (2014.11); *H04N 19/103* (2014.11); *H04N 19/147* (2014.11); *H04N 19/149* (2014.11); *H04N 19/176* (2014.11)

(58) Field of Classification Search
CPC ........................ H04N 19/103; H04N 19/147
See application file for complete search history.

(56) References Cited

U.S. PATENT DOCUMENTS

| 2012/0243611 A1* | 9/2012 | Kondo ................. H04N 19/132 375/E7.193 |
| 2018/0192068 A1* | 7/2018 | Nam .................... H04N 19/124 |

* cited by examiner

*Primary Examiner* — Jerry T Jean Baptiste

(57) ABSTRACT

Techniques for encoding and decoding media content, and more specifically to selecting filter coefficients for filtering coding artifacts from the encoded media content are described. The filter coefficients are selected by an encoder for a given frame based on a statistical record of one or more previous frames in a data stream. The statistical record indicates the effectiveness of different sets of filter coefficients in reducing encoding artifacts for the one or more previous frames. By employing the statistical record to select filter coefficients for the next frame in the data stream, the encoder is able to select the filter coefficients relatively quickly, reducing encoding latency while ensuring that a decoder is able to effectively decode the encoded frames.

20 Claims, 4 Drawing Sheets

SINGLE PASS FILTER COEFFICIENTS SELECTION

BACKGROUND

Video and other media content is often encoded to reduce resource usage (e.g., memory resources, processor resources, communication bandwidth, and the like) and is decoded prior to display to a user. However, the encoding process causes artifacts that impact the quality of the encoded media content. Examples of encoding artifacts include a distortion of the media content caused by lossy compression, improper conversions, and the like, and in some cases these artifacts are visible to the user, negatively impacting the user experience. Accordingly, some decoders employ one or more filters to decrease or eliminate these encoding artifacts from the encoded media content. However, conventional filtering approaches have inefficiencies that result in added latency when processing encoded media content. For example, conventional encoders employ relatively complex operations to determine appropriate filter coefficients for the one or more filters, introducing undesirable latency in the encoding process.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
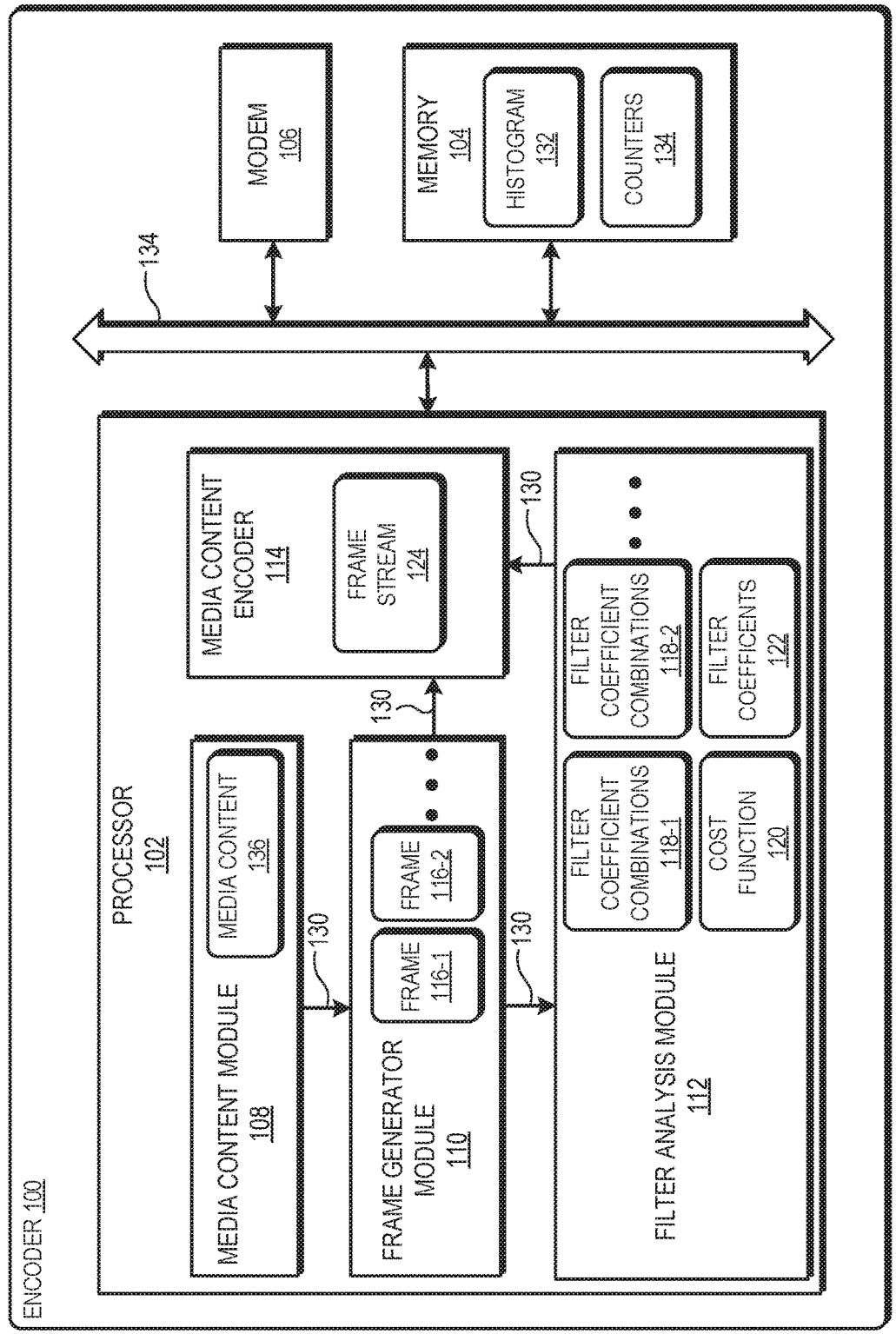
FIG. 1 is a block diagram of an encoder that supports single pass filter coefficients selection in accordance with some embodiments.

FIGS. 1-4 illustrate techniques for encoding and decoding media content, and more specifically to selecting filter coefficients for filtering coding artifacts from the encoded media content. The filter coefficients are selected by an encoding computing device (referred to for purposes of description as the encoder) for a given frame based on a statistical record of one or more previous frames in a data stream. The statistical record indicates the effectiveness of different combinations of filter coefficients in reducing encoding artifacts for the one or more previous frames. By employing the statistical record to select filter coefficients for the next frame in the data stream, the encoder is able to select the filter coefficients relatively quickly, reducing encoding latency while ensuring that a decoder is able to effectively decode the encoded frames.

To illustrate, in some embodiments the encoder is configured to encode media content using a specified coding algorithm, referred to as a codec. When encoding the media content, the codec produces encoding artifacts that influence the quality of the encoded media content. A decoding computing device (referred to for purposes of description as the decoder) decodes the coded media content according to the specified codec, and as part of the decoding process, the decoder applies a filter (e.g., an enhancement filter) to reduce or eliminate these artifacts from the encoded media content. To decrease decoding latency, the encoder selects filter coefficients that are expected to effectively address the encoding artifacts and provide the filter coefficients to the decoding device as part of the coded media content.

Conventionally, the encoder determines the filter coefficients using a two-pass approach. As part of the two-pass approach, the encoder evaluates a set of filter coefficient combinations per frame. For example, the encoder evaluates 64 filter coefficient combinations on each coding block associated with a frame. The encoder also determines the best filter coefficient combination of the set and tabulates a frequency counter of that particular filter coefficient combination, for example, in a memory of the encoder. Next, as part of the two-pass approach, the encoder determines a subset of coefficient combinations from the set of coefficient combinations. For example, in some embodiments, the encoder selects the 8 filter coefficient combinations from the set based on the tabulated frequency counter of each of the 8 filter coefficient combinations. Thus, the encoder selects the 8 most frequent winning filter coefficient combinations. This conventional method uses significant bandwidth and memory, and increases encoding latency. In addition, with the two-pass approach, there is a need to store each unfiltered frame after the first pass, increasing the demand on memory resources In contrast to the conventional approach, the techniques described herein select filter coefficients based on a single pass for each frame of a frame sequence associated with the media content. In particular, the encoder maintains a set of candidate filter coefficients based on historical record of the expected performance of different coefficient combinations across different frames of the frame stream, updating the set as each frame is encoded, and provides the set of candidate filter coefficients to the decoder with the encoded frames. By using the historical record, the encoder is able to quickly identify the candidate filter coefficient combinations for a given frame relatively quickly, with a single pass of a filter associated with the encoder, thereby reducing encoding latency.

To illustrate via an example, in some embodiments the encoder identifies, for each coding block in a given frame, a cost function (e.g., a rate-distortion (RD) cost function) for each of a specified set of different filter coefficient combinations for the frame. The encoder then determines the filter coefficient combinations with the lowest RD cost for each coding block (the winning combination). The encoder maintains a record (e.g. a histogram) of the performance of the filter coefficient combinations across multiple frames. When processing the next frame, the encoder employs the record to calculate an average performance and a standard deviation to eliminate any outlier data points (e.g., filter coefficient combinations with the fewest wins). The outlier combinations that have been eliminated are replaced with new filter coefficient combinations from the specified set of filter coefficient combinations according to some selection criteria (e.g., a round-robin selection operation). The remaining data points correspond to the most likely filter coefficient combinations to yield the best filter performance in the next frame. Once the filter coefficient combinations have been determined, they are inserted in the compressed bitstream associated with the coded media content, so that they are made available to the decoder during decoding of the coded media content.

FIG. 1 is a block diagram of an encoder 100 that supports single pass filter coefficients selection in accordance with some embodiments. The encoder 100 includes one or more software and hardware components for bi-directional communications including components for encoding media content 136. In some embodiments, the encoder 100 is part of an electronic device that supports encoding of the media content 136, including a smartphone, a tablet, a laptop, a desktop computer, a server, a game console, and the like. In the example of FIG. 1, the encoder 100 includes at least a processor 102, a memory 104, and a modem 106. These components are in electronic communication via one or more interfaces (e.g., a bus 134).

The processor 102 is a processing device (e.g., a general-purpose processor, a central processor unit (CPU), a graphics processor unit (GPU), an application-specific integrated circuit (ASIC), a field-programmable gate array (FPGA), a programmable logic device, or the like) that generally supports execution of sets of instructions (e.g., computer programs) in order to a carry out specified tasks on behalf of the electronic device. In some embodiments, the processor 102 is configured to interface with the memory 104 using a memory controller integrated into the processor 102.

The memory 104 includes a random-access memory (RAM) and a ready-only memory (ROM). In some embodiments, the memory 104 stores computer-readable, computer-executable code including instructions that, when executed, cause the processor 102 to perform various functions described herein. In some embodiments, the memory 104 includes, among other features, a basic input/output system (BIOS), which controls basic hardware or software operations such as the interaction with peripheral components of the encoder 100. The code is stored in a non-transitory computer-readable medium as system memory or other type of memory. In some other embodiments, the memory 104, additionally or alternatively, stores a histogram 132 related to filter coefficient combinations associated with a filter for removing or decreasing encoding artifacts in encoded media content as described herein.

The modem 106 communicates bi-directionally, via one or more antennas, wired, or wireless communication links (e.g., a Wi-Fi communication link, a cellular communication link). In some embodiments, the modem 106 is configured to modulate packets carrying encoded media content and provide modulated packets to the antennas for transmission, and to demodulate packets carrying encoded media content received from the antennas. In some embodiments, the modem 106 represents a wireless transceiver configured to communicate bi-directionally with another computing device, such as a decoder as described in FIG. 2.

In the illustrated embodiment, the processor 102 includes a media content module 108, a frame generator module 110, a filter analysis module 112, and a media content encoder 114. In some embodiments, the media content module 108 is configured to generate the media content 136 (e.g., images, video, audio) on behalf of the encoder 100 for communication to another computing device via the modem 106. For example, in some embodiments, the media content module 108 is a program executing at the processor 102 that generates video content for communication to another computing device.

To generate the video content the media content module 108 signals to the frame generator module 110 via a control signal 130 to generate one or more frames 116 associated with the media content 136 (e.g., images, video, audio). For example, the media content module 108 signals to the frame generator module 110 via a control signal 130 to generate one or more frames associated with a video. The frame generator module 110 is implemented by the processor 102 or other components of the encoder 100. The frame generator module 110 signals to the media content encoder 114 via a control signal 130 the one or more generated frames.

The media content encoder 114 is implemented by the processor 102 or other components of the encoder 100. In some embodiments, the media content encoder 114 encodes the one or more generated frames into an encoded frame stream 124 according to a specified encoding technique, referred to as a codec. In some embodiments, the media content encoder 114 is configured to forward the encoded frame stream 124, for example, to the modem 106 for transmission to another computing device (e.g., such as the decoder 200 as described in FIG. 2).

In some embodiments, when the media content encoder 114 encodes the media content 136 (e.g., a video), the encoding process causes encoding artifacts that impact the quality of the encoded media content 136. The decoder receiving the encoded media content 136 employs one or more filters to reduce or eliminate these encoding artifacts from the encoded media content 136. To reduce decoding latency, the media content encoder 114 selects filter coefficient combinations 118 that are expected to effectively address the encoding artifacts and provides the filter coefficient combinations 118 to a decoder as part of the encoded media content 136.

To support efficient selection of filter coefficient combinations, the processor 102 employs the filter analysis module 112 to analyze frames generated by the filter analysis module 112, and selects the filter coefficient combinations based on the analysis. For example, in some embodiments, the filter analysis module 112 determines one or more filter coefficient combinations 118 based on application of an enhancement filter, such as a constrained directional enhancement filter. The constrained directional enhancement filter, in some embodiments, includes a primary filter and a secondary filter. In some embodiments, the filter analysis module 112 selects filter coefficients 122 from a set of filter coefficient combinations such that a cost function 120 (e.g., an RD cost function) is minimized. The filter coefficient combinations 118 for the primary filter are selected from a filter coefficient pool of 16 filter coefficient combinations sets, for example, based on a direction of a respective coding block associated with each frame 116. The filter coefficient combinations 118 for the secondary filter are selected from a filter coefficient pool of 4 filter coefficient combinations sets, for example, based also on a direction of a respective coding block associated with each frame 116.

To illustrate, a frame 116, in some embodiments, includes one or more coding block, with each coding block having a size. For example, in some embodiments each coding block of a frame 116 has a size of 64-by-64 pixels. In some embodiments, the codec implemented by the encoder 100 allows a maximum of 8 different filter coefficient candidate combinations out of 64 filter coefficient combinations on each coding block per frame 116. The filter analysis module 112 thereby selects 1 out of 8 filter coefficient combinations for each coding block. Once the 8 filter coefficient candidate combinations have been determined, the encoder 100 inserts them in a compressed bitstream so it is available in a decoding process at another computing device (e.g., the decoder 200 as described in FIG. 2).

The determination of the 8 filter coefficient candidate combinations begins with a first coding block of a respective frame 116 and continues until all 8 filter coefficient candidate combinations have been determined. In some embodiments, the encoder 100 is configured to determine an optimal set of primary and secondary filter coefficient combinations applied to an entire coding block to maximize a BD-PSNR for each frame 116. The filter coefficient combinations 118 are then shared (e.g., transmitted) in a compressed bitstream to another computing device (e.g., the decoder 200 as described in FIG. 2) to reconstruct the encoded media content.

As described herein, the encoder 100 is configured to perform a one-pass approach based on an assumption that media content of two successive frames 116 of the frame stream 124, for example, a first frame 116-1 and a second frame 116-2 are correlated (e.g., are contiguous frames in the frame stream 124). As part of processing the frame 116-1, the filter analysis module 112 calculates a cost function 120 (e.g., an RD cost function) associated with each filter coefficient combination of a set of filter coefficient combinations M. In some embodiments, M is between 2≤M≤64 different filter coefficient combinations.

As part of processing the first frame 116-1, the filter analysis module 112 determines a filter coefficient combination M with the lowest cost (e.g., RD cost) and updates one or more counters 134 (e.g., a frequency counter) corresponding to that filter coefficient combination. For example, the filter analysis module 112 processes the first frame 116-1 and, as part of the processing, determines the cost function 120 (e.g., an RD cost function) of the set of filter coefficient candidate combinations M. In some embodiments, the filter analysis module 112 determines the cost function 120 of the set of filter coefficient candidate combinations M for each coding block (e.g., 64×64 coding block) in the first frame 116-1. The filter analysis module 112 determines a first subset of filter coefficient candidate combinations of the set of filter coefficient candidate combinations M that satisfy a cost function threshold (e.g., filter coefficient combinations with the lowest RD cost). The filter analysis module 112 then updates the counter associated with each of the winning filter coefficient combinations.

At the end of the processing of the first frame 116-1, the filter analysis module 112 generates or updates a model, for example, a histogram 132 representing a performance of the M filter coefficient combinations (e.g., filter coefficient combinations 118). In other embodiments, the encoder 100 deploys other models representing the performance of the M filter coefficient combinations. The filter analysis module 112 then uses the model, for example, the histogram 132 when processing the second frame 116-2 to calculate an average performance and a standard deviation to eliminate any outlier data points. The remaining data points correspond to the most likely R filter coefficient combinations to yield the best filter performance in a subsequent frame (1<=R<=M) following the second frame 116-2. The remaining R filter coefficient combinations wholly or partially constitute the 8 candidate combinations used in the filtering for the next frame, and to partially constitute the M combinations to be monitored during the processing of the next frame.

For the next frame, the filter analysis module 112 replaces the outlier combinations that have been eliminated with new filter coefficient combinations from the set of 64 combinations according to a selection criterion. In some embodiments, for example, the filter analysis module 112 determines the new filter coefficient combinations from the set of 64 combinations based on a least recently replaced filter coefficient combinations. In some other embodiments, for example, the filter analysis module 112 determines the new filter coefficient combinations from the set of 64 combinations based on most frequent winning filter coefficient combinations (e.g., filter coefficient combinations with highest corresponding frequency counters). For example, when processing a respective frame 116, the filter analysis module 112 determines an RD cost associated with each respective filter coefficient combination 118 and for the filter coefficient combination 118 with the lowest RD cost (i.e., the winning filter coefficient combination), the filter analysis module 112 updates a respective counter 134, in the memory 104. The respective counter 134 corresponds to the respective filter coefficient combination 118 (or respective filter coefficients 122) having the lowest RD cost. For the other respective filter coefficient combination 118 that did not have the lowest RD cost or meet an RD cost threshold, the filter analysis module 112 does not update a respective counter 134, in the memory 104. The new filter coefficient combinations from the set of 64 combinations thereby correspond to a highest respective counter 134 in the memory 104. In other embodiments, for example, the filter analysis module 112 determines the new filter coefficient combinations from the set of 64 combinations based on a round-robin selection operation. In some embodiments, when R<8, the unfilled filter coefficient candidate combinations are chosen from the first winning combinations among the M combinations being monitored, as the processing of the frame proceeds. The filter analysis module 112 forwards the filter coefficients combinations 118 (e.g., 8 filter coefficient candidate combinations) to the media content encoder 114, which are inserted in a compressed bitstream for transmission to another computing device.

Figure 2:
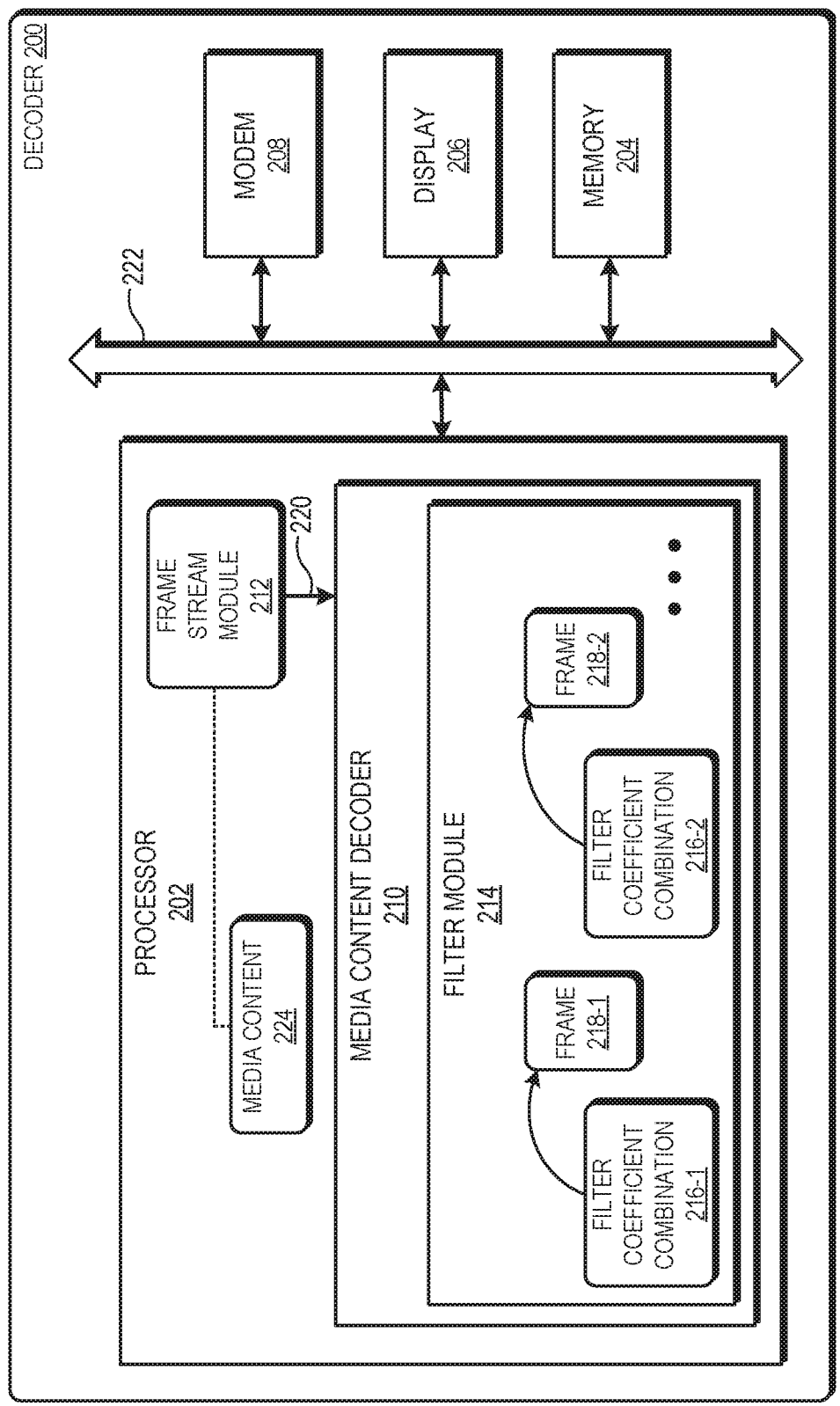
FIG. 2 is a block diagram of a decoder in accordance with some embodiments.

FIG. 2 is a block diagram of a decoder 200 in accordance with some embodiments. The decoder 200 includes one or more software and hardware components for bi-directional communications including components for decoding media content 224. In some embodiments, the decoder 200 is part of an electronic device that supports decoding of the media content 224, including a smartphone, a tablet, a laptop computer, a desktop computer, a server, a game console, and the like. In the example of FIG. 2, the decoder 200 includes at least a processor 202, a memory 204, a display 206, and a modem 208. These components are in electronic communication via one or more interfaces (e.g., a bus 222).

The processor 202 is a processing device (e.g., a general-purpose processor, a CPU, a GPU, an ASIC, an FPGA, a programmable logic device, or the like) that generally supports execution of sets of instructions (e.g., computer programs) in order to a carry out specified tasks on behalf of the electronic device. In some embodiments, the processor 202 is configured to interface with the memory 204 using a memory controller integrated into the processor 202.

The memory 204 includes a RAM and a ROM. In some embodiments, the memory 204 stores computer-readable, computer-executable code including instructions that, when executed, cause the processor 202 to perform various functions described herein. In some embodiments, the memory 204 includes, among other features, a BIOS, which controls basic hardware or software operations such as the interaction with peripheral components of the decoder 200. The code is stored in a non-transitory computer-readable medium as system memory or other type of memory.

The display 206 is a unit capable of displaying media content 224, such as video, images, or any other type of data for consumption by a viewer. In some embodiments, the display 206 includes a liquid-crystal display (LCD). In some other embodiments, the display 206 includes an LED display. In other embodiments, the display 206 includes an organic LED (OLED) display or an active-matrix OLED (AMOLED).

The modem 208 communicates bi-directionally, via one or more antennas, wired, or wireless communication links (e.g., a Wi-Fi communication link, a cellular communication link). In some embodiments, the modem 208 is configured to modulate packets carrying encoded media content 224 and provide modulated packets to the antennas for transmission, and to demodulate packets carrying encoded media content 224 received from the antennas. In some embodiments, the modem 208 represents a wireless transceiver configured to communicate bi-directionally with another computing device, such as the encoder 100 as described in FIG. 1.

In some embodiments, the processor 202 includes a media content decoder 210 and a frame stream module 212. These components are in electronic communication our coupled via one or more electronic interfaces. The media content decoder 210 and the frame stream module 212 are implemented by the processor 202 or other components of the decoder 200. In some embodiments, the decoder 200 receives a frame stream 220, for example, from a frame stream module 212. In some embodiments, the frame stream 220 is in form of a bitstream and corresponds to one or more frames.

The media content decoder 210, in some embodiments, includes a filter module 214, which is implemented by the processor 202 or other components of the decoder 200. The filter module 214 is configured to identify respective filter coefficient combinations 216 for each respective frame 218 of the frame stream 220. For example, the filter module 214 determines a first filter coefficient combination 216-1, based on information received via the frame stream 220 from an encoder (e.g., the encoder 100 as described in FIG. 1), to apply to a first frame 218-1 to filter out encoding artifacts from the first frame 218-1. Similarly, the filter module 214 determines a second filter coefficient combination 216-2 to apply to a second frame 218-2, to filter out encoding artifacts from the second frame 218-2, based on information provided in the frame stream 220. Although only two filter coefficient combinations and two frames are shown, the filter module 214 is configured to perform similar or equivalent operations on additional frames of the frame stream 220.

Figure 3:
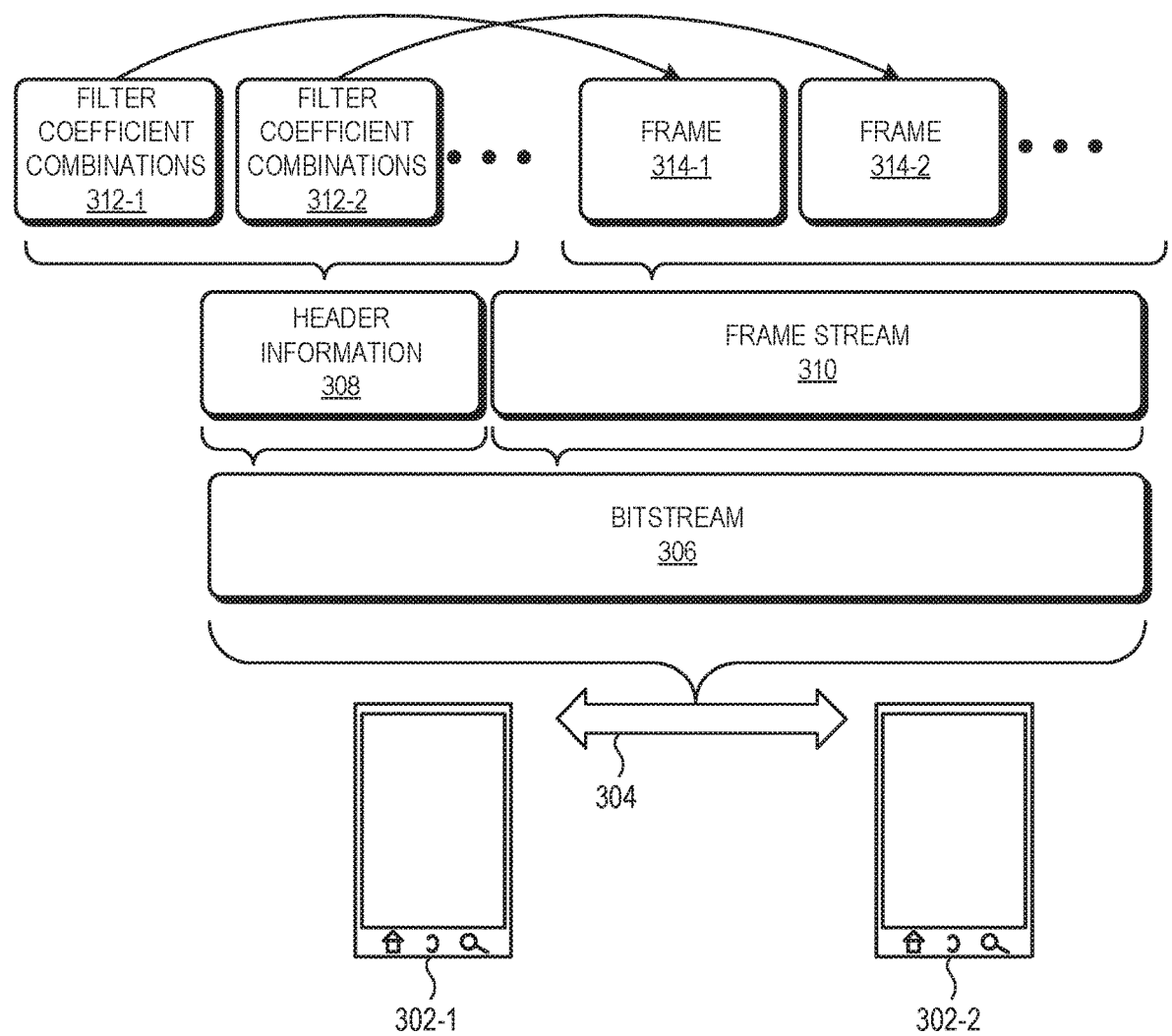
FIG. 3 is a block diagram of a system including an encoder and a decoder that support single pass filter coefficients selection in accordance with some embodiments.

FIG. 3 is a block diagram of a system including an encoder 302-1 and a decoder 302-2 that support single pass filter coefficients selection in accordance with some embodiments. The encoder 302-1 is an example of an encoder as described with reference to FIG. 1. The decoder 302-2 is an example of a decoder as described with reference to FIG. 2. The encoder 302-1 and the decoder 302-2 support improvements to filter coefficient determination to reduce latency and increase reliability of filtering encoding artifacts from encoded media content.

The encoder 302-1 and the decoder 302-2 exchange information over a communication link 304, which supports one or multiple radio access technologies. For example, the encoder 302-1 and the decoder 302-2 exchange media content over the communication link 304. Examples of radio access technologies include fourth generation (4G) (e.g., Long-Term Evolution (LTE)), fifth generation (5G) (e.g., 5G new radio (NR)). Other examples of radio access technologies include Institute of Electrical and Electronics Engineers (IEEE) 802.11 (Wi-Fi) and IEEE 802.16 WiMAX.

The encoder 302-1 transmits, to the decoder 302-2, a bitstream 306 over the communication link 304. Likewise, the decoder 302-2 receives, from the encoder 302-1, the bitstream 306 over the communication link 304. The encoder 302-1, in some embodiments, transmits, and the decoder 302-2 receives, one or more packets including the bitstream 306. In some embodiments, the bitstream 306 is a compressed media bitstream including media-related information, which the decoder 302-2 uses to decode and render media content at the decoder 302-2.

The bitstream 306 includes header information 308 and a frame stream 310. In some embodiments, the header information 308 includes one or multiple information elements, in which a portion of the information elements in the header information 308 carry filter coefficient combination information. For example, the header information 308 includes filter coefficient combinations 312 for frames 314 of the frame stream 310. The encoder 302-1 determines the filter coefficient combinations, prior to transmitting the bitstream 306, using the techniques described herein, such as statistical modeling. For example, the encoder 302-1 determines, for the frame 314-1, an RD cost function for each set of different filter coefficient combinations. The encoder 302-1 then determines the filter coefficient combinations with the lowest RD cost. The encoder 302-1 maintains a record, for example, a histogram of the performance of the number of filter coefficient combinations 312 across multiple frames 314. When processing the next frame 314-2, the encoder 302-1 employs the record to calculate an average performance and a standard deviation to eliminate any outlier data points (e.g., filter coefficient combinations with the fewest wins). The outlier combinations that have been eliminated are replaced with new filter coefficient combinations from the specified set of filter coefficient combinations according to some selection criteria (e.g., a round-robin selection operation). The remaining data points correspond to the most likely filter coefficient combinations to yield the best filter performance in the next frame 314-2. Once the filter coefficient combinations have been determined, they are inserted in the compressed bitstream 306, so that they are made available to the decoder 302-2 during decoding of the frame stream 310. When decoding the frames 314, the decoder 302-2 thereby uses the filter coefficient combination information to filter out encoding artifacts in each frame 314.

By way of example, when decoding frame 314-1, the decoder 302-2 identifies filter coefficient combinations 312-1 corresponding to the frame 314-1 and decodes the frame 314-1 using at least one filter coefficient combination from the filter coefficient combinations 312-1. Similarly, when decoding frame 314-2, the decoder 302-2 identifies filter coefficient combinations 312-2 corresponding to the frame 314-2 and decodes the frame 314-2 using at least one filter coefficient combination from the filter coefficient combinations 312-2. Thus, the decoder 302-2 identifies respective filter coefficient combinations 216 to use for each respective frame 218. The decoder 302-2 repeats the above operations for each frame 314 in the frame stream 310.

Figure 4:
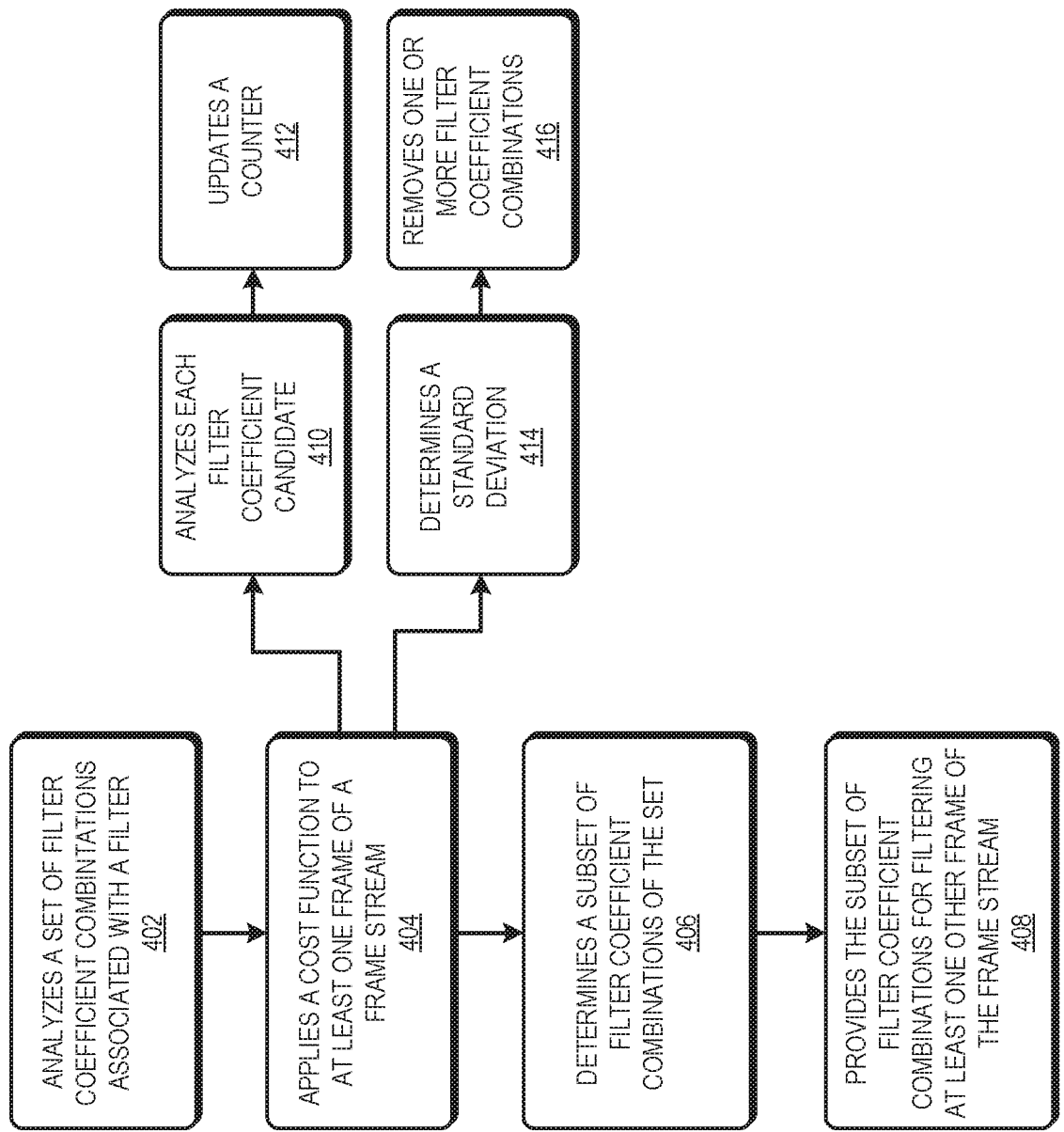
FIG. 4 is a flow diagram illustrating a method for single pass filter coefficients selection in accordance with some embodiments.

FIG. 4 is a flow diagram illustrating a method for single pass filter coefficients selection in accordance with some embodiments. In some embodiments, the method is implemented by an encoder or its components as described with reference to FIG. 1. For example, an encoder is implemented or configured to perform the method to improve filter coefficient determination to reduce latency and increase the reliability of filtering encoding artifacts from encoded media content. In some embodiments, an encoder executes a set of instructions to control the functional elements of the encoder to perform the operations described below. Additionally, or alternatively, an encoder performs aspects of the operations described below using special-purpose hardware.

At block 402, an encoder analyzes a set of filter coefficient combinations associated with a filter. In some embodiments, the filter is an in-loop filter that is part of an encoding pipeline of the encoder and configured to filter encoding artifacts from encoded media content (e.g., an image, a video). In some embodiments, the filter is an enhancement filter, such as a constrained directional enhancement filter. The constrained directional enhancement filter, in some embodiments, consists of at least two filters including a primary filter and a secondary filter. In some embodiments, the filter coefficient combinations are for the primary filter and the secondary filter.

At block 404, the encoder applies a cost function to at least one frame of a frame stream. For example, the encoder determines the cost function for the set of filter coefficient combinations. In some embodiments, the encoder determines the cost function for the set of filter coefficient combinations for each coding block in at least one frame of the frame stream. In some embodiments, at block 410 the encoder analyzes each filter coefficient candidate. For example, the encoder analyzes each filter coefficient candidate to identify one or more filter coefficient candidates that meet a cost function threshold. At block 412, the encoder updates a counter for each of the one or more filter coefficient candidates that meet the cost function threshold. Additionally, or alternatively, the encoder, at block 414, determines a standard deviation, for example, based on an average of a performance metric associated with the one or more filter coefficient candidates. In some embodiments, the encoder, at block 416, removes one or more filter coefficient candidates of the set based on the standard deviation.

At block 406, the encoder determines a subset of filter coefficient combinations of the set, and at block 408 provides the subset of filter coefficient combinations for filtering at least one other frame of the frame stream. In some embodiments, the encoder uses the subset of filter coefficient combinations to determine filter coefficient combinations for a subsequent frame of the frame stream. Subsequently when processing a following frame, the encoder selects one or more additional filter coefficient candidates of the set of filter coefficient candidates based on a filter coefficient candidate selection procedure as described herein. For example, the encoder selects the one or more additional filter coefficient candidates based on a least recently replaced filter coefficient candidate criteria. In some embodiments, the encoder selects the one or more additional filter coefficient candidates based on a most frequent winning filter coefficient candidate. In other embodiments, the encoder selects the one or more additional filter coefficient candidates based on a round-robin operation on the set of filter coefficient candidates.

In some embodiments, the apparatus and techniques described above are implemented in a system including one or more integrated circuit (IC) devices (also referred to as integrated circuit packages or microchips), such as an encoder and a decoder described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining a subset of filter coefficient combinations of a set of filter coefficient combinations associated with a filter based on applying a cost function to a first frame of a frame stream, wherein the filter comprises a constrained directional enhancement filter comprising at least two non-linear low pass filters; and
   providing the subset of filter coefficient combinations for filtering a second frame of the frame stream.

2. The method of claim 1, wherein determining the subset of filter coefficient combinations comprises:
   determining the subset of filter coefficient combinations based on applying the cost function to each coding block of the first frame.

3. The method of claim 1, further comprising:
   determining that the subset of filter coefficient combinations satisfy a cost function threshold; and
   selecting the subset of filter coefficient combinations from the set of filter coefficient combinations associated with the filter based on determining that the subset of filter coefficient combinations satisfy the cost function threshold.

4. The method of claim 1, further comprising:
   analyzing each filter coefficient candidate of the set of filter coefficient combinations based on applying the cost function to the first frame of the frame stream;
   updating a counter of one or more filter coefficient candidates of the set of filter coefficient combinations based on analyzing each filter coefficient candidate of the set of filter coefficient combinations; and
   selecting the subset of filter coefficient combinations from the set of filter coefficient combinations based on the updated counter of the one or more filter coefficient candidates.

5. The method of claim 1, further comprising:
   determining a statistical model associated with the set of filter coefficient combinations based on applying the cost function to the first frame of the frame stream, wherein the statistical model identifies filter coefficient combinations for at least the first frame or the second frame, or both, of the frame stream.

6. The method of claim 5, wherein determining the statistical model comprises:
   determining a histogram representing a performance of the subset of filter coefficient combinations of the set of filter coefficient combinations associated with the filter based on applying the cost function to the first frame of the frame stream.

7. The method of claim 1, further comprising:
   determining an average of a performance metric associated with the subset of filter coefficient combinations; and
   determining a standard deviation associated with the subset of filter coefficient combinations based on the determined average of the performance metric associated with the subset of filter coefficient combinations.

8. The method of claim 7, further comprising:
   removing one or more filter coefficient combinations of the subset of filter coefficient combinations based on the standard deviation;
   selecting one or more additional filter coefficient combinations of the set of filter coefficient combinations based on a filter coefficient candidate selection procedure; and
   including the one or more additional filter coefficient combinations to the subset of filter coefficient combinations for filtering the second frame of the frame stream.

9. The method of claim 8, wherein selecting the one or more additional filter coefficient combinations comprises:
   selecting the one or more additional filter coefficient combinations based on a filter coefficient combinations replacement value associated with each of the one or more additional filter coefficient combinations.

10. The method of claim 8, wherein selecting the one or more additional filter coefficient combinations comprises:
    selecting the one or more additional filter coefficient combinations based on the one or more additional filter coefficient combinations having a highest counter value compared to other filter coefficient combinations in the set of filter coefficient combinations.

11. The method of claim 8, wherein selecting the one or more additional filter coefficient combinations comprises:
    selecting the one or more additional filter coefficient combinations based on a round-robin operation on the set of filter coefficient combinations.

12. The method of claim 1, further comprising:
    generating a bitstream associated with the frame stream; and
    inserting frame correlation information in the generated bitstream, wherein the frame correlation information comprises a respective subset of filter coefficient combinations for each frame of the frame stream.

13. The method of claim 1, wherein the cost function comprises a rate distortion cost function.

14. The method of claim 1, wherein each filter coefficient combination comprises a first filter coefficient of a first non-linear low pass filter of the at least two non-linear low pass filters and a second filter coefficient of a second non-linear low pass filter of the at least two non-linear low pass filters.

15. An apparatus comprising:
    one or more processors;
    memory coupled to the one or more processors; and
    instructions executable by the one or more processors to:
       determine a subset of filter coefficient combinations of a set of filter coefficient combinations associated with a filter based on applying a cost function to a first frame of a frame stream, wherein the filter comprises a constrained directional enhancement filter comprising at least two non-linear low pass filters; and
       provide the subset of filter coefficient combinations for filtering a second frame of the frame stream.

16. The apparatus of claim 15, wherein the instructions to determine the subset of filter coefficient combinations are further executable by the one or more processors to:

determine the subset of filter coefficient combinations based on applying the cost function to each coding block of the first frame.

17. The apparatus of claim 15, wherein the instructions are further executable by the one or more processors to:
determine that the subset of filter coefficient combinations satisfy a cost function threshold; and
select the subset of filter coefficient combinations from the set of filter coefficient combinations associated with the filter based on determining that the subset of filter coefficient combinations satisfy the cost function threshold.

18. The apparatus of claim 15, wherein the instructions are further executable by the one or more processors to:
analyze each filter coefficient candidate of the set of filter coefficient combinations based on applying the cost function to the first frame of the frame stream;
update a counter of one or more filter coefficient candidates of the set of filter coefficient combinations based on analyzing each filter coefficient candidate of the set of filter coefficient combinations; and
select the subset of filter coefficient combinations from the set of filter coefficient combinations based on the updated counter of the one or more filter coefficient candidates.

19. A method comprising:
determining a subset of filter coefficient combinations of a set of filter coefficient combinations associated with a filter based on applying a cost function to a first frame of a frame stream;
providing the subset of filter coefficient combinations for filtering a second frame of the frame stream; and
determining a statistical model associated with the set of filter coefficient combinations based on applying the cost function to the first frame of the frame stream, wherein the statistical model identifies filter coefficient combinations for at least the first frame or the second frame, or both, of the frame stream.

20. An apparatus comprising:
one or more processors;
memory coupled to the one or more processors; and
instructions executable by the one or more processors to:
determine a subset of filter coefficient combinations of a set of filter coefficient combinations associated with a filter based on applying a cost function to a first frame of a frame stream;
provide the subset of filter coefficient combinations for filtering a second frame of the frame stream; and
determine a statistical model associated with the set of filter coefficient combinations based on applying the cost function to the first frame of the frame stream, wherein the statistical model identifies filter coefficient combinations for at least the first frame or the second frame, or both, of the frame stream.

* * * * *